United States Patent [19]

Kosten

[11] Patent Number: 4,517,419
[45] Date of Patent: May 14, 1985

[54] CANTILEVER SPRING TELEPHONE HOOKSWITCH ADAPTED FOR PRINTED WIRING CARD MOUNTING

[75] Inventor: Richard B. Kosten, Huntsville, Ala.

[73] Assignee: GTE Communication Systems Corp., Northlake, Ill.

[21] Appl. No.: 437,973

[22] Filed: Nov. 1, 1982

[51] Int. Cl.³ .......................... H01H 1/18; H04M 1/08
[52] U.S. Cl. .................................... 179/159; 179/164; 200/241; 200/246
[58] Field of Search .......... 179/164, 159, 167, 158 R; 200/241, 242, 246, 292

[56] References Cited

U.S. PATENT DOCUMENTS

| 724,478 | 4/1903 | Holmok | 179/164 |
| 2,089,386 | 8/1937 | Lum | 179/164 X |
| 2,671,840 | 3/1954 | Sway | 200/164 A |
| 4,268,726 | 5/1981 | Chu | 179/164 |

FOREIGN PATENT DOCUMENTS 1134111  8/1962  Fed. Rep. of Germany ...... 179/159

Primary Examiner—Thomas W. Brown
Attorney, Agent, or Firm—Robert J. Black; Gregory G. Hendricks

[57] ABSTRACT

A hookswitch mechanism for use in a telephone instrument utilizing a compound form cantilever spring fastened to a printed wiring card with circuit connections made to the printed wiring card. A contact engaging portion on the cantilever spring wipes across a contact located on the printed wiring card before disengaging the contact to insure a clean contact surface regardless of surrounding atmospheric conditions.

10 Claims, 2 Drawing Figures

4,517,419

CANTILEVER SPRING TELEPHONE HOOKSWITCH ADAPTED FOR PRINTED WIRING CARD MOUNTING

BACKGROUND OF THE INVENTION

The present invention relates to a cantilever spring contact switch and more particularly to a telephone hookswitch.

Various types of hookswitches are employed in telephone instruments whereby one or more contacts in a spring group are actuated when the associated handset of the telephone instrument is lifted or replaced. Numerous forms of hookswitches are known having been the subject of many patent applications and patents filed during the past century. Recent examples are disclosed in U.S. Pat. Nos. 3,448,225, 3,558,832 and 4,268,726. Hookswitches disclosed in each of the subject patents effectively perform the basic requirement for the hookswitch of opening and closing circuitry in response to placement of the telephone handset in contact or removal from the associated hookswitch. However, in most prior art hookswitches the switching contacts included therein are subject to the formation of a film or oxide thereon which might impede or isolate current flow. This phenomena is particularly true when the telephone is operated in an area where the atmosphere may be considered corrosive. Accordingly, it is the object of the present invention to overcome the above outlined disadvantage by providing a hookswitch structure in which contacts thereof separate or join with a wiping action when the handset is placed in contact with or removed from the hookswitch.

SUMMARY OF THE INVENTION

The present invention consists of a hook-switch assembly utilizing a printed wiring card as the base or foundation thereof. Attached to the printed wiring card is a compound form cantilever spring at one end fastened to the printed wiring card and a portion thereof extending through the card for electrical connection to the telephone circuitry. A first cantilever section of the spring extends away from the printed wiring card and below the card and then connected by a double bend is a second cantilever section which extends back towards the printed wiring card. Included in that second section is a contact engaging section which may be of precious metal and which engages in the "off-hook" position contacts mounted on the printed wiring card. Included in the first cantilever section is an area of reduced cross-section which permits a reduced radius of movement for the cantilever spring during operation. Also mounted on a movable basis to the printed wiring card is an actuator device adapted to be engaged by the telephone handset. Extending from the actuator device is a projecting arm which passes through an opening in the printed wiring card, which in the "on-hook" position contacts the free end or second portion of the compound cantilever spring.

When the handset is placed on the actuator, the arm extends down through an opening in the printed wiring card contacting the free end of the compound spring which tends to rotate about the axis formed by the reduced cross-section portion of the initial section of the cantilever spring causing a wiping action against the contact provided in the printed wiring card. As the actuator moves closer to the printed wiring card the actuator arm extends further, causing the contact engaging portion of the cantilever arm to disengage completely from the associated contact. In this way, the wiping action precedes each disengagement of the contacts, assuring a continued clean surface to overcome current flow problems. Likewise, when the handset is removed from the hook-switch the cantilever spring will move up with the contact engaging portion coming in contact with the circuit contact on the printed wiring card and then moving forward with a wiping action similar to that outlined above.

DESCRIPTION OF THE PREFERRED EMBODIMENT

Figures 1, 2:
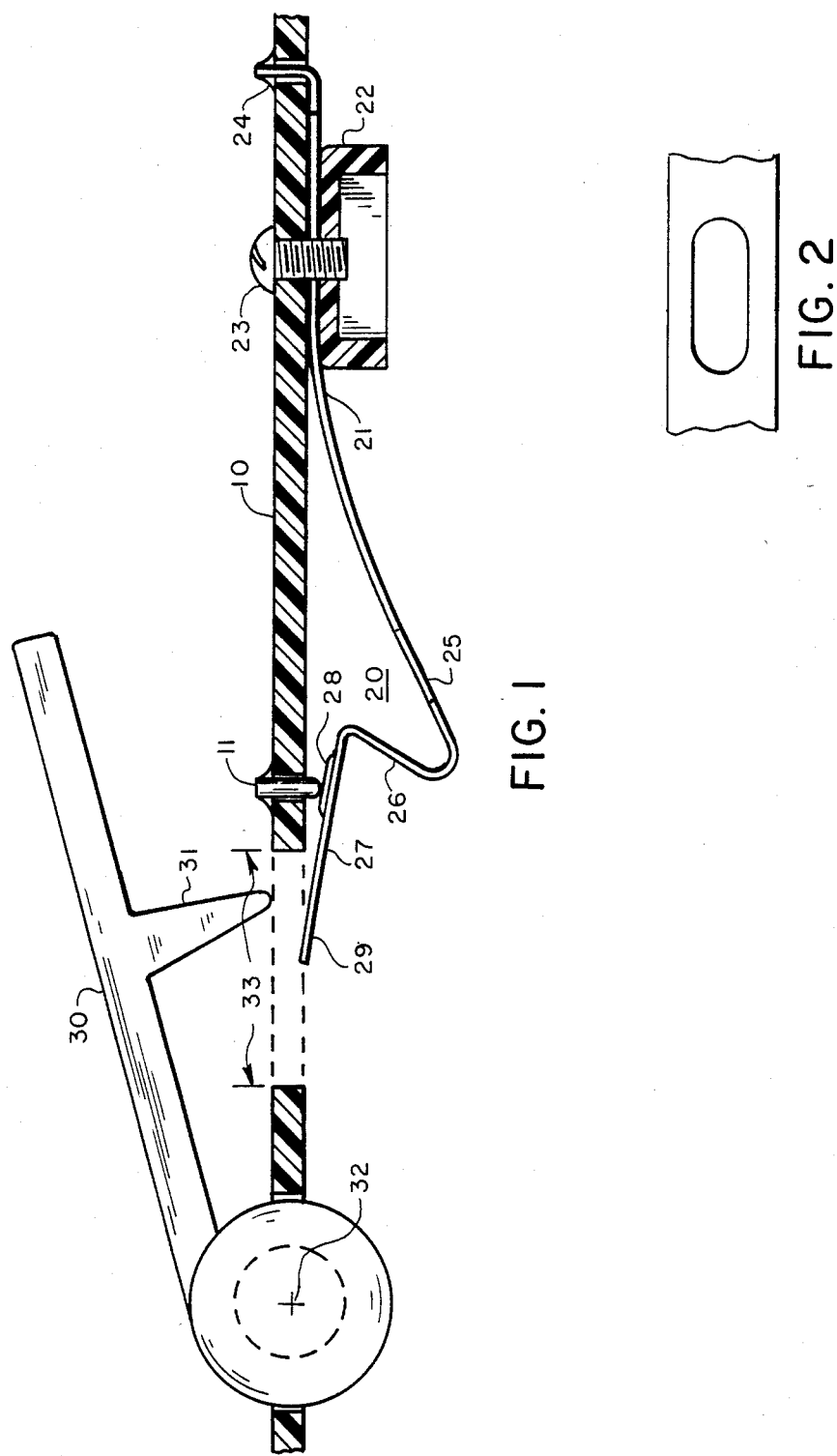
FIG. 1 is a side elevation view, partly in section of a hookswitch in accordance with the present invention.
FIG. 2 is a partial top view of the section of contact spring of the present invention showing that portion having a reduced cross-section and designated as 25 in FIG. 1.

Referring first to FIG. 1, there is shown a printed wiring card 10 to which is fastened a cantilever spring structure 20 and an actuator assembly 30. The cantilever spring structure has a support end 21 which lies along the underside of printed wiring card 10 and is held in contact with the printed wiring card by support element 22 which is retained in place by screw 23. Extending from the end of the cantilever spring structure 20 is a contact portion 24 which extends through the printed wiring card to the top surface thereof where it makes an electrical contact with circuitry on the printed wiring card.

Cantilever spring structure 20 extends downward away from the printed wiring card from the support end 21 to a connecting portion 26 where by means of two curves or bends it is connected to a second cantilever section 27. The second cantilever section 27 includes a free end 29 and contact engaging portion 28 mounted on the second cantilever section 27. This latter portion may be of precious metal to insure minimal oxidation and maximum current handling capability. Included in the first cantilever section is a portion of reduced cross-section designated 25. The reduction in cross-section may be achieved by several different means, however, as shown in FIG. 2 an elongated opening made within the cantilever spring reduces the cross-section and thus increases the flexibility at this location.

The contact engaging portion 28 engages contact 11 which extends from the bottom portion of the printed wiring card through to its top portion where it makes electrical contact with the associated circuitry.

The actuator portion 30 for the present hookswitch is fastened to the printed wiring card about a pivot point 32 allowing it to rotate in a direction towards the spring member. A return spring not shown restores the actuator to the "off-hook" or uppermost position. The particular details of the operation of the actuator portion do not form part of the present invention, it only being required that projecting arm 31 or similar device extend from a portion of the actuator and that during rotation this engaging arm passes through an opening 33 in the printed wiring card to come in contact with the free end 29 of the cantilever spring 20.

As may be seen, the telephone is in the "off-hook" position as shown in FIG. 1. When the handset is placed on the hookswitch 30, the engaging arm 31 will descend through opening 33, coming in contact with the free end 29 of the cantilever spring assembly 20. At this time, the weight of the handset will cause the spring assembly to flex at a point determined by the section of the spring having a reduced cross-section 25. This will cause a wiping action of contact portion 28 against contact 11, thus frictionally moving or scraping away any film or oxide which might impede or isolate current flow. As the weight of the handset continues to cause the actuator portion to move in a downward direction, the spring will now move about an axis determined by the support portion 21, with the contact portion effectively disengaging from the contact 11. As noted above, when the handset is removed from the hookswitch a reverse action takes place, resulting in a similar wiping action of the spring contacts.

While but a single embodiment of the present invention has been shown it will be obvious to those skilled in the art that numerous modifications may be made without departing from the theory of the present invention which shall be limited only by the scope of the claims appended hereto.

What is claimed is:

1. For use in a telephone instrument, a hookswitch assembly comprising: a planar base including an electrical contact mounted thereon; a first resilient cantilever arm including a support end fastened to said base and a flexible section including a cross section reduced in area relative to the cross section of the rest of said first cantilever arm; a second resilient cantilever arm including a free end and a contact engaging surface positioned against said electrical contact; connecting means joining said first cantilever arm to said second cantilever arm; and an actuator assembly initially operated in a first direction to depress said second arm, wiping said contact engaging surface across said contact and further operated in said first direction to depress said first arm, disengaging said contact engaging surface from said contact.

2. A hookswitch assembly as claimed in claim 1 wherein: said planar base is constructed of elctrically insulating material.

3. A hookswitch assembly as claimed in claim 1 wherein: said planar base comprises a printed wiring card.

4. A hookswitch assembly as claimed in claim 1 wherein: said first and second cantilever arms are of metallic construction.

5. A hookswitch assembly as claimed in claim 1 wherein: said support end includes an electrical circuit connection.

6. A hookswitch assembly as claimed in claim 1 wherein: said connecting means is constructed of the same material as said first and second cantilever arms.

7. A hookswitch assembly as claimed in claim 1 wherein: said connecting means and said first and second cantilever arms comprise a single spring element.

8. A hookswitch assembly as claimed in claim 1 wherein: said actuator assembly is movably mounted to said planar base.

9. A hookswitch assembly as claimed in claim 8 wherein: said planar base further includes an opening extending therethrough; and said actuator assembly includes a projection extending through said base opening; and in response to operation of said actuator assembly said projection engages said second cantilever arm.

10. A hookswitch assembly as claimed in claim 1 wherein: said actuator assembly is adapted to be operated in a second direction to engage said contact engaging surface with said contact and subsequent thereto to wipe said contact engaging surface across said contact.

* * * * *